Feb. 2, 1926.
A. J. BRAMLETTE, JR
1,571,788
SHOCK ABSORBER
Filed April 23, 1925
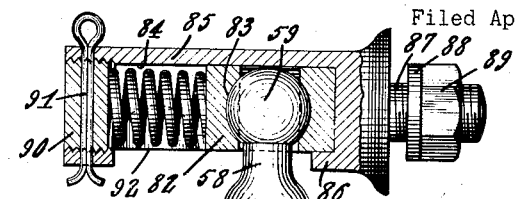
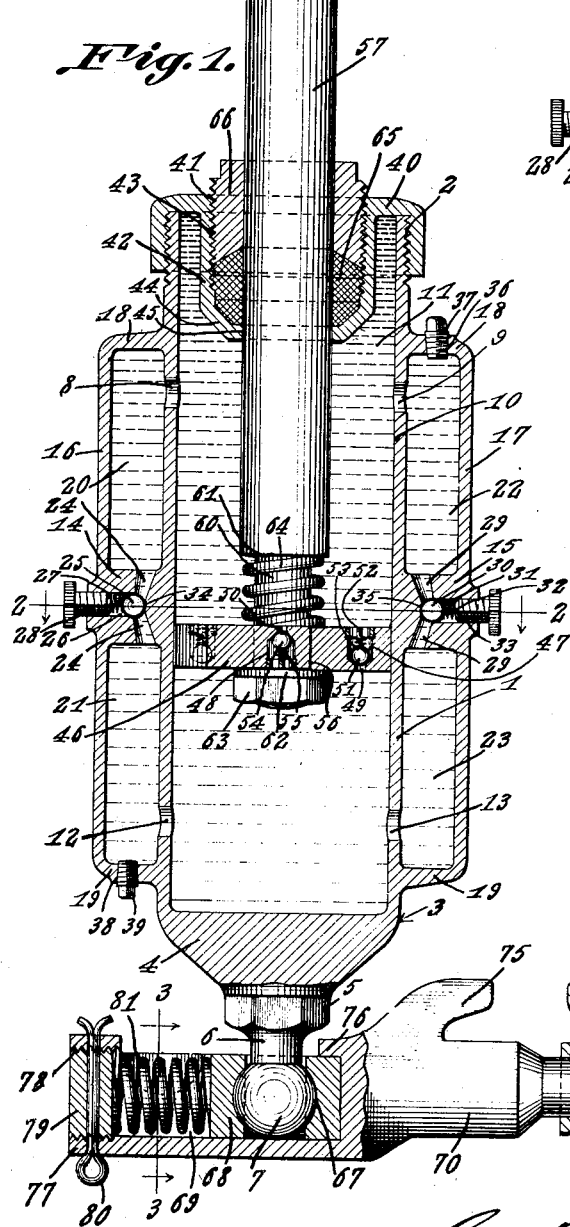
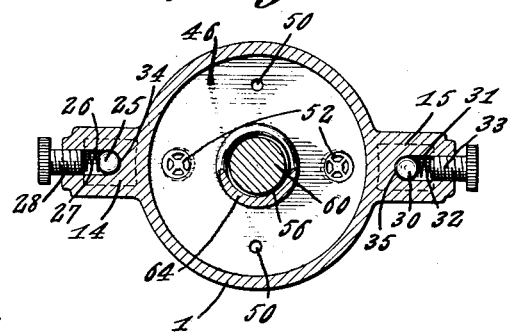
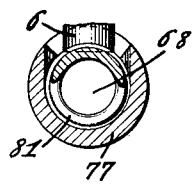
INVENTOR.
A.J.Bramlette,Jr,
BY
Geo. P. Kimmel ATTORNEY.

Patented Feb. 2, 1926.

1,571,788

UNITED STATES PATENT OFFICE.

ANDREW J. BRAMLETTE, JR., OF HUNTINGTON PARK, CALIFORNIA, ASSIGNOR OF ONE-THIRD TO J. C. CRAIG, OF LOS ANGELES, CALIFORNIA.

SHOCK ABSORBER.

Application filed April 23, 1925. Serial No. 25,337.

*To all whom it may concern:*

Be it known that I, ANDREW J. BRAMLETTE, Jr., a citizen of the United States, residing at Huntington Park, in the county of Los Angeles and State of California, have invented certain new and useful Improvements in Shock Absorbers, of which the following is a specification.

This invention relates to a shock absorber, more particularly to that class for use in connection with motor vehicles, such as automobiles and trucks, but it is to be understood that a shock absorber, in accordance with this invention, can be employed for any purposes for which it is found applicable, and the invention has for its object to provide, in a manner as hereinafter set forth, a shock absorber having means for readily resisting any sudden shock or impact on the springs of the vehicle that might occur from striking an obstruction or rut in a highway, thereby preventing damage to the springs on rebound.

A further object of the invention is to provide, in a manner as hereinafter set forth, a shock absorber, having means for stabilizing the body of the vehicle incidental to the travelling over rough or uneven road surfaces, so as to overcome quick depression or rebound of the vehicle springs.

A further object of the invention is to provide, in a manner as hereinafter set forth, a shock absorber of the fluid type, having adjustable means for controlling the displacement of the liquid, as may be desired under different conditions with respect to loads or roads, thereby insuring a satisfactory shock absorbing action during the travel of the vehicle.

Further objects of the invention are to provide, in a manner as hereinafter set forth, a shock absorber of the fluid type, which is simple in its construction and arrangement, strong, durable, compact, thoroughly efficient in its use, conveniently adjusted, readily installed with respect to a motor vehicle, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a vertical sectional view of a shock absorber, in accordance with this invention.

Figure 2 is a section on line 2—2, Figure 1.

Figure 3 is a section on line 3—3, Figure 1.

Referring to the drawings in detail, a shock absorber, in accordance with this invention, comprises a fluid container consisting of a cylindrical body portion 1, having an open top and a closed bottom. The body portion 1 can be of any desired length and diameter. The periphery of the body portion 1, at its upper end terminal part, is threaded, as at 2. The bottom of the body portion 1 is generally referred to by the reference character 3, and comprises a tapered portion 4, which merges into a polygonal-shaped portion 5. The latter terminates in a cylindrical portion 6 merging into a spherical portion 7 of greater diameter than the cylindrical portion 6.

The body portion 1, at a point between its transverse center and upper end, is formed with a pair of diametrically opposed openings 8, 9, and each of which forms a combined inlet and outlet for the fluid chamber 10 provided by the body portion 1. The fluid in the chamber 10 is indicated at 11 and may consist of a body of oil or other suitable material adapted to be displaced to set up a shock absorbing action. The body portion 1, between its transverse center and its lower end, is formed with a pair of diametrically opposed openings 12, 13 and each of which also provides a combined inlet and outlet for the chamber 10.

Formed integral with the body portion 1, as well as extending laterally therefrom in opposite directions, is a pair of diametrically opposed webs 14, 15, which not only constitute a pair of partitions, but further means for coupling a pair of channel-shaped members 16, 17, centrally thereof, to the body portion 1.

The channel-shaped members 16 and 17 extend longitudinally of the body portion 1, project laterally therefrom, and are closed at their upper and lower ends, as at 18, 19, respectively. The members 16 and 17 are of a length to extend above the openings 8 and 9 and below the openings 12 and 13, and the sides and ends of each of said members are integral with the body portion 1.

The web 14, in connection with the member 16 and body portion 1, forms upper and lower fluid receiving compartments 20 and 21 respectively. The web 15, in connection with the member 17 and body portion 1, provides upper and lower fluid receiving compartments 22, 23 respectively. The compartments 20, 21, 22 and 23 communicate with the chamber 10 through the medium of the openings 8, 12, 9 and 13 respectively.

The compartment 20 communicates with the compartment 21 through the medium of a valved passage 24 extending through the web 14. The passage 24 gradually increases in diameter from its center towards each end thereof, and from its center towards each end of said passage the latter inclines towards the body portion 1. The valve for controlling the passage 24 is of the ball type and is indicated at 25. An opening 26 disposed at right angles with respect to the body portion 1, extends through the web 14 and outer side of the member 15. The opening 26, at its inner end, communicates with the passage 24, and the valve 25 is shiftably mounted in said opening 26. Arranged in the opening 26 and bearing against the valve 25 is a controlling spring 27 therefor, which has its tension adjusted through the medium of an adjusting screw 28, which threadedly engages with the wall of the opening 26.

The compartment 22 communicates with the compartment 23 through the medium of a valved passage 29 extending through the web 15. The passage 29 gradually increases in diameter from its center toward each end thereof, and from its center toward each end of said passage the latter inclines toward the body portion 1. The valve for controlling the passage 29 is of the ball type and is indicated at 30. An opening 31 disposed at right angles with respect to the body portion 1, extends through the web 15 and outer side of the member 17. The opening 31, at its inner end, communicates with the passage 29, and the valve 30 is shiftably mounted in said opening 31. Arranged in the opening 31 and bearing against the valve 30 is a controlling spring 32 therefor, which has its tension adjusted through the medium of an adjusting screw 33, which threadedly engages with the wall of the opening 31.

The wall of the passage 24 is formed with a seat 34 for the valve 25, and the wall of the passage 29 is formed with a valve seat 35 for the valve 30. The seats 34 and 35 are disposed centrally of the passages 24, 29 respectively. The adjusting screws 28 and 32, in connection with the springs 27 and 33, provide means for controlling the shift of the valves 25 and 30 for the purpose of controlling the displacement of the fluid 11 when passing from compartments 20 and 22 to compartments 21 and 23, or when passing from compartments 21 and 23 to compartments 20 and 22. The compartments 20, 21, in connection with the passage 24, provide a by-pass for the displaced fluid from the upper to the lower, or from the lower to the upper ends of the chamber 10, and the compartments 22, 23, in connection with the passage 29, provide a by-pass for the displaced fluid from the upper to the lower and from the lower to the upper ends of the chamber 10. The openings 8, 9, 12 and 13 coact with the chamber 10 and compartments 20, 21, 22 and 23 to provide for the by-pass of the displaced fluid from one end to the other end of the cylinder.

The upper end 18 of the member 17 is formed with an opening 36 closed by a removable plug 37, and the bottom 19 of the member 16 is provided with an opening 38 closed by a screw plug 39. The openings 35 and 36 are employed for draining, filling, cleaning or for any other desired purposes.

The upper end of the body portion 1 is closed by an interiorly threaded cap 40, which threadedly engages with the threads 2 on the periphery of the body portion 1. The cap 40 is formed with an opening 41 of substantial diameter and which has the wall thereof threaded, and formed integral with the inner face of the cap 40 is a substantially elongated sleeve 42, having its inner diameter the same as the diameter of the opening 41 and with the upper portion of the inner face of said sleeve 42 flush with the wall of the opening 41. The inner face of the sleeve 42, for a portion of its length, is threaded, as at 43, and said threads form a continuation of the threads of the wall of the opening 41. The lower portion of the sleeve 42 is inset, as at 44, and said inset portion is of tapered contour and provided at its lower end with an inwardly extending flange 45. The opening formed by the flange 45 is of materially less diameter than the diameter of the opening 41.

Operating in the chamber 10 is a fluid displacing element and which comprises a piston head 46 of a diameter to snugly engage the wall of the chamber 10. The head 46 is formed with a pair of diametrically opposed sockets 47, which open at the upper face of the head 46, and the latter is furthermore provided with a pair of diametrically opposed sockets 48 opening at the lower face of the head 46. The sockets 47 are alternately disposed with respect to the sockets 48 and the said sockets 47 and 48 are spaced equi-distant from each other. The lower portion of the head 46 is formed with a pair of diametrically opposed ports 49, and each of which opens into a socket 47, and the upper portion of said head 46 is formed with a pair of diametrically opposed ports 50 and each of which opens into a socket 48. The inner wall of each of said sockets, as indicated at 51, is of tapered contour to provide a valved seat. The outer end of each of said sockets has mounted therein a spider 52, of a thickness to be spaced a substantial distance from the inner wall of the socket. Arranged in each socket 47 is a ball valve 53, and arranged in each socket 48 is a ball valve 54. Interposed between the ball valves and the spider, within said sockets, is a valved controlling spring 55. The valves 53 move to open position and the valves 54 to closed position when the piston head 46 moves downwardly, and the valves 54 move to open position and the valves 53 to closed position when the piston head 46 moves upwardly. The piston head 46 is formed with a centrally disposed opening 56 of greater diameter than either one of the sockets.

The fluid displacing element further includes a piston rod 57, having its upper terminal portion reduced, as at 58, and which terminates into a globular portion 59. The lower end of the piston rod 57 is reduced, as at 60, thereby providing a shoulder 61, and slidably mounted on the reduced end 60 is the piston head 46. The reduced end 60 extends through the opening 56 in the piston head 46 and carries a washer 62 and a securing nut 63. The washer 62 abuts against the lower face of the piston 46. Surrounding the reduced end 60 of the piston rod 57, and interposed between the shoulder 61 and the piston head 46, is a coiled controlling spring 64 for the piston head 46. The mounting of the piston head 46 on the piston rod 57 in the manner as stated, permits the spring to take up the first rebound and which will also provide for an operative shift of the piston head in the event that any of the valves carried thereby, become stuck by any means whatsoever.

The piston rod 57 extends down through the cap and sleeve 42 and mounted in the latter and surrounding the piston rod 57 is a packing 65 retained in position by a gland 66, which threadedly engages with the wall of the opening 41 and the threads 43 of the sleeve 42. This arrangement prevents leakage.

The cylindrical body portion 1 is adapted to be connected to a part of the vehicle, such as an axle, and the fluid displacing element is to be attached to the body or frame of the vehicle and during the travel of the vehicle, the said element will have a vertical movement relative to the axle. The globular end 59 of the body portion 1 is seated in a socket 67 formed in an apertured disk 68, slidably mounted in a pocket 69, formed in the inner end of a support 70 provided with a peripherally threaded extension 71, carrying a clamping member 72, a washer 73 and a securing nut 74. The support 70 has an integral up-standing wing 75, which coacts with the clamping member 72 for securing the support 70 to the axle of the vehicle. The support 70 is flanged, as at 76, and which flange overlaps one end of the pocket 69. The rear end of the support 70, and which is indicated at 77, is formed with an opening 78, having the wall thereof threaded, and threadedly engaging with said wall is an abutment 79, which is further secured to the support 70 by a cotter pin 80. Interposed between the abutment 79 and the disk 68 is a coiled controlling spring 81 which tends to maintain the disk 68 against the forward end wall of the pocket 69. The spherical ends 7 of the body portion 1, in connection with the disk 68, set up a ball and socket joint between the body portion 1 and the support 70, and the latter in connection with the elements carried thereby, provides a spring controlled connection between the lower end of the body portion 1 and the vehicle axle.

The means for connecting the fluid displacing element with the body portion or frame of the vehicle is the same as the support 70 and the elements carried thereby, other than that the wing 75 and clamping member are dispensed with. The support or coupling connection between the upper end 59 of the displacement element and the vehicle body or frame, comprises a disk 82 formed with a socket 83 for the end 59. The disk 82 is mounted in a pocket 84, formed in a support 85, and the latter is provided with a flange 86 which overlaps the disk 82. The support further includes a threaded stem 87 carrying a washer 88 and a securing nut 89 for fixedly securing the stem 87 to the vehicle body or frame. Threadedly engaging with the support 85 is an abutment member 90, secured against displacement by a cotter pin 91. Interposed between the abutment 90 and disk 82 is a coiled controlling spring 92.

The chamber 10 and compartments are suitably filled with a body of oil or other fluid and as the piston head 46 moves upwardly or downwardly, incidental to the action of the springs of the vehicle, the fluid is caused to flow from one side to the other side of the piston by the force thereof and the opening of the ball valves.

The construction of the shock absorber is such that it provides for the stabilizing of the body portion of the vehicle incidental to traveling over rough and uneven surfaces, and furthermore it overcomes the quick depression or quick rebound of the vehicle springs, due to the fact of the valve control means for the displacing of the fluid in the chamber 10, then furthermore the control of the displaced fluid can be regulated as required for different conditions of loads or roads, and it is thought that the many advantages of a shock absorber, in accordance with this invention, can be readily understood, and although the preferred embodiment of the invention is as illustrated and described, yet it is to be understood that changes in the details of construction can be had which will fall within the scope of the invention as claimed.

What I claim is:—

1. In a shock absorber of the fluid displacement type, a fluid displacing element comprising a piston rod having a reduced inner end providing a shoulder, a piston head slidably mounted on said inner end and provided with ports for the passage of the fluid, reversely acting valves controlling said ports, and resilient means on said rod between said shoulder and head for cushioning the latter.

2. In a shock absorber, a fluid containing cylinder having means to provide for the displacement of the fluid carried thereby, a fluid displacing element operating in and including a piston rod projecting from one end of said cylinder, means to provide a spring controlled ball and socket connection directly between the outer end of said rod and the body or frame of a vehicle, and means to provide a spring controlled ball and socket connection between the other end of said cylinder and the axle of the vehicle.

3. In a shock absorber, a fluid containing cylinder provided with means to form at each side thereof a pair of fluid by-passes extending lengthwise of the cylinder and each opening at each end into the latter, said means including an integral ported partition intersecting each of said by-passes centrally and a controllable valve centrally within and centrally of each partition for regulating the passage of the fluid through its respective by-pass, the port in each partition opening into a by-pass and extended at an inclination from each end towards its center, the center of said port providing a seat for the valve, each of said valves common to the travel of the fluid in either direction through its respective by-pass.

4. In combination, a shock absorber provided with a spherical enlargement exteriorly of each end, and means associated with said enlargements to provide a universal joint connection between each end of the absorber and a part of the vehicle with which the absorber is used.

5. In combination, a shock absorber including a pair of coacting cushioning elements, one shiftable relatively to the other, one of said elements extending into the other, each of said elements having its outer end provided with a spherical enlargement, and means associated with said enlargements to provide universal joint connection between the outer end of each of said elements and a part of the vehicle with which the absorber is used.

6. In combination, a shock absorber provided with a spherical enlargement exteriorly of each end thereof, and means associated with said enlargements to provide a spring controlled universal joint connection between each end thereof and a part of the vehicle with which the absorber is used.

7. In combination, a shock absorber including a pair of coacting cushioning elements, one shiftable relative to the other, one of said elements extending into the other, each of said elements having a spherical outer end, and means associated with said enlargements to provide a spring controlled universal joint connection between the outer end of each of said elements and parts of the vehicle with which the absorber is used.

8. In a shock absorber, a fluid containing cylinder having a closed lower end and an open upper end, means connected with said cylinder to provide a pair of fluid by-passes and an integral partition intersecting centrally each by-pass and formed with an oppositely extending inclined port opening into that by-pass with which it associates a cap for closing the upper end of said cylinder, a controlling valve mounted in each of said partitions and seating centrally of the inclined port therein a sleeve depending from the lower face of the cap into said cylinder, a fluid displacing element extended through said cap and sleeve, and a packing means secured in said sleeve for said element.

In testimony whereof, I affix my signature hereto.

ANDREW J. BRAMLETTE, Jr.